US008171231B2

(12) United States Patent
Sistla (10) Patent No.: US 8,171,231 B2
(45) Date of Patent: *May 1, 2012

(54) SYSTEM AND METHOD FOR AGGREGATING CORE-CACHE CLUSTERS IN ORDER TO PRODUCE MULTI-CORE PROCESSORS

(75) Inventor: Krishnakanth Sistla, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/207,318

(22) Filed: Aug. 10, 2011

(65) Prior Publication Data
US 2011/0296116 A1   Dec. 1, 2011

Related U.S. Application Data

(63) Continuation of application No. 11/605,636, filed on Nov. 29, 2006, now Pat. No. 8,028,131.

(51) Int. Cl.
*G06F 12/00* (2006.01)

(52) U.S. Cl. ........ 711/146; 711/118; 711/119; 711/124; 711/130

(58) Field of Classification Search .................. 711/118, 711/119, 130, 124, 146
See application file for complete search history.

(56) References Cited

U.S. PATENT DOCUMENTS

| | | | |
|---|---|---|---|
| 5,432,918 A | 7/1995 | Stamm | |
| 5,809,536 A * | 9/1998 | Young et al. | 711/144 |
| 5,870,616 A | 2/1999 | Loper et al. | |
| 5,875,472 A | 2/1999 | Bauman et al. | |
| 5,893,151 A | 4/1999 | Merchant | |
| 6,009,488 A | 12/1999 | Kavipurapu | |
| 6,038,673 A | 3/2000 | Benn et al. | |
| 6,327,606 B1 | 12/2001 | Chidambaran | |
| 6,801,984 B2 * | 10/2004 | Arimilli et al. | 711/146 |
| 6,804,761 B1 | 10/2004 | Chen et al. | |
| 6,959,358 B2 | 10/2005 | Regev et al. | |
| 7,007,176 B2 | 2/2006 | Goodfellow et al. | |
| 7,043,650 B2 | 5/2006 | Bresniker et al. | |
| 7,126,970 B2 | 10/2006 | Zboril | |
| 7,249,381 B2 | 7/2007 | Telesco | |
| 7,325,050 B2 | 1/2008 | O'Cpnnor et al. | |
| 7,409,504 B2 * | 8/2008 | Rajamony et al. | 711/141 |
| 7,644,293 B2 | 1/2010 | Sistla et al. | |
| 7,769,956 B2 | 8/2010 | Tsien | |
| 7,827,425 B2 | 11/2010 | Hutsell et al. | |
| 2002/0178329 A1 | 11/2002 | Chaudhry et al. | |
| 2003/0055969 A1 | 3/2003 | Begun | |
| 2003/0084359 A1 | 5/2003 | Bresniker et al. | |

(Continued)

OTHER PUBLICATIONS

U.S. Appl. No. 11/479,438, Notice of Allowance mailed Aug. 20, 2009.

(Continued)

*Primary Examiner* — Kevin Ellis
*Assistant Examiner* — Mehdi Namazi
(74) *Attorney, Agent, or Firm* — Blakely, Sokoloff, Taylor & Zafman LLP (57) ABSTRACT

According to one embodiment of the invention, a processor comprises a memory, a plurality of core-cache clusters and a scalability agent unit that operates as an interface between an on-die interconnect and multiple core-cache clusters. The scalability agent operates in accordance with a protocol to ensure that the plurality of core-cache clusters appear as a single caching agent.

20 Claims, 6 Drawing Sheets

U.S. PATENT DOCUMENTS

| | | | |
|---|---|---|---|
| 2005/0177344 A1* | 8/2005 | Khaleel | 702/186 |
| 2005/0262505 A1 | 11/2005 | Esfahany et al. | |
| 2006/0149885 A1* | 7/2006 | Sistla et al. | 710/310 |
| 2007/0055826 A1 | 3/2007 | Morton et al. | |
| 2007/0079072 A1* | 4/2007 | Collier et al. | 711/133 |
| 2007/0233932 A1* | 10/2007 | Collier et al. | 711/100 |
| 2008/0002603 A1 | 1/2008 | Hutsell | |
| 2008/0005596 A1 | 1/2008 | Sistla | |
| 2008/0126707 A1 | 5/2008 | Sistla | |
| 2008/0126750 A1 | 5/2008 | Sistla | |
| 2009/0037658 A1* | 2/2009 | Sistla | 711/119 |

OTHER PUBLICATIONS

U.S. Appl. No. 11/479,009 Office Action mailed Jun. 23, 2009.
U.S. Appl. No. 11/605,636 Office Action mailed Apr. 2, 2009.
U.S. Appl. No. 11/479,438 Office Action mailed Feb. 20, 2009.
U.S. Appl. No. 11/606,347, Office Action mailed Jan. 27, 2009.
U.S. Appl. No. 11/606,347, Final Office Action mailed Jul. 27, 2009.
PCT International Search Report and Written Opinion, Internaitonal application No. PCT/US2007/072294, mailed Oct. 30, 2007.
Final Office Action from U.S. Appl. No. 11/606,347 mailed Dec. 28, 2010, 10 pages.
U.S. Appl. No. 11/606,347, Office Action dated May 9, 2011.
U.S. Appl. No. 11/479,009, Office Action dated Jan. 15, 2010.
U.S. Appl. No. 11/479,009, Notice of Allowance mailed Jun. 2, 2010.
HyperTransport Link Specification, Revision 2.00b, Apr. 27, 2005.
Notice of Allowance from U.S. Appl. No. 11/605,636, mailed May 20, 2011, 11 pages.
Intel Corp., Non Final Office Action mailed Jun. 3, 2010; U.S. Appl. No. 11/606,347.
Intel Corp., Final Office Action mailed Apr. 22, 2010; U.S. Appl. No. 11/605,636.

* cited by examiner

SYSTEM AND METHOD FOR AGGREGATING CORE-CACHE CLUSTERS IN ORDER TO PRODUCE MULTI-CORE PROCESSORS

CROSS-REFERENCE OF RELATED APPLICATION

This application is a continuation of U.S. patent application Ser. No. 11/605,636, now U.S. Pat. No. 8,028,131.

FIELD

Embodiments of the invention relate to the field of integrated circuits, and according to one embodiment of the invention, a system and method for aggregating, in a scalable manner, core-cache clusters in order to produce a variety of multi-core processors.

GENERAL BACKGROUND

Microprocessors generally include a variety of logic circuits fabricated on a single semiconductor integrated circuit (IC). These logic circuits typically include a processor core, memory, and other components. More and more high-end processors are now including more than one processor core on the same IC. For instance, multi-core processors such as Chip Multi-Processors (CMPs) for example, feature a multi-core structure that implements multiple processor cores within an IC.

Increased silicon efficiencies are now providing new opportunities for adding additional functionality into the processor silicon. As an example, applications are taking advantage of increased multi-threading capabilities realized from an increased number of processing cores in the same processor. Hence, it is becoming important to develop a communication protocol that optimizes performance of a multi-core processor by mitigating system interconnect latency issues and ensuring that aggregated processor cores appear as one caching agent in order to avoid scalability issues and interconnect saturation.

BRIEF DESCRIPTION OF THE DRAWINGS

The invention may best be understood by referring to the following description and accompanying drawings that are used to illustrate embodiments of the invention.

DETAILED DESCRIPTION

Herein, certain embodiments of the invention relate to a system and scalable method for aggregating core-cache clusters of a multi-core processor. The multi-core processor interfaces with a system interconnect such as a Common System Interconnect (CSI).

In the following description, certain terminology is used to describe features of the invention. For example, the term "core-cache cluster" is generally considered to be a modular unit that comprises one or more cores and a shared cache. Core-cache clusters are used as building blocks for a scalable, multi-core processor. For instance, several core-cache clusters may be joined together in accordance with a scalability agent protocol as described below.

According to one embodiment of the invention, the "scalability agent protocol" is a communication scheme that enables the aggregating of core-cache clusters operating independently from each other, and provides "graceful" scalability where the responsibility for maintaining memory coherency is approximately shared equally among the core-cache clusters despite any increase or decrease in number. This is accomplished because the scalability agent protocol is partitionable among address regions in the system memory address space. The latencies to the cache in the core-cache cluster substantially remains unchanged as the number of cores increases.

A "scalability agent" is hardware and/or software that manages the flow of outgoing and incoming transactions into a socket associated with the core-cache cluster and supports the scalability agent protocol described above. According to one embodiment of the invention, the scalability agent (i) aggregates core-cache clusters to appear as one caching agent, (ii) handles local cache coherence between core-cache clusters on the same integrated circuit (IC), and (iii) support scalability so that the operations of a core-cache cluster are not significantly effected if other core-cache clusters are added.

A "transaction" is generally defined as information transmitted, received or exchanged between devices. For instance, a message, namely a sequence of bits, may form part of or the complete transaction. Furthermore, the term "interconnect" is generally defined as an information-carrying pathway for messages, where a message may be broadly construed as information placed in a predetermined format. The interconnect may be established using any communication medium such as a wired physical medium (e.g., a bus, one or more electrical wires, trace, cable, etc.) or a wireless medium (e.g., air in combination with wireless signaling technology).

According to CSI operability, a "home agent" is generally defined as a device that provides resources for a caching agent to access memory and, based on requests from the caching agents, can resolve conflicts, maintain ordering and the like. A "caching agent" is generally defined as primarily a cache controller that is adapted to route memory requests to the home agent.

I. System Architectures

Figure 1:
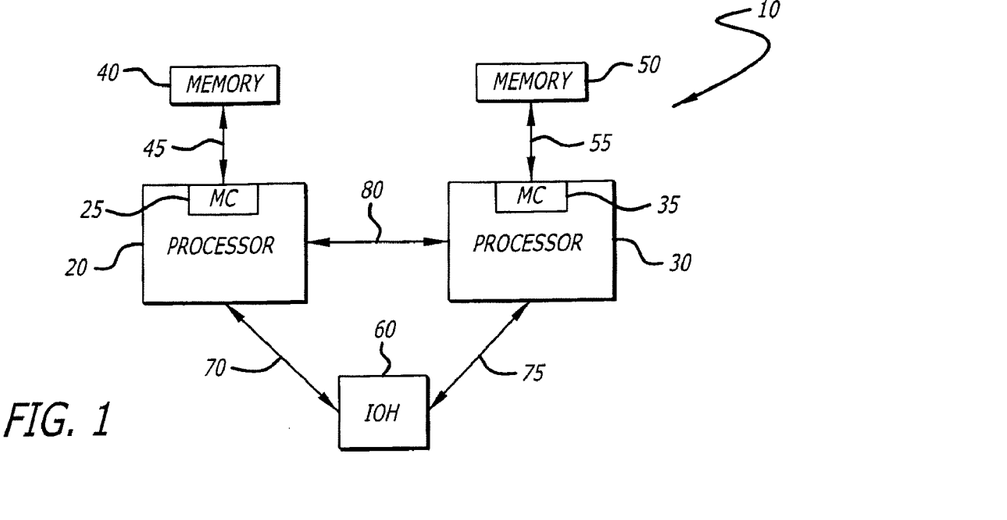
FIG. 1 is an exemplary block diagram of a data processing system implemented with one or more multi-core processors.

Referring now to FIG. 1, an exemplary block diagram of a data processing system 10 implemented with one or more multi-core processors. As shown, two multi-core processor are implemented within data processing system 10, which operates as a desktop or mobile computer, a server, a set-top box, personal digital assistant (PDA), alphanumeric pager, cellular telephone, video console or any other device featuring multi-core processors and an input device controlled by a user (e.g., keyboard, keypad, mouse, hand-held controller, etc.).

Herein, according to one embodiment of the invention, system 10 comprises a pair of multi-core processors such as a first processor 20 and a second processor 30 for example. Each processor 20 and 30 includes a memory controller (MC) 25 and 35 to enable direct communications with an associated memory 40 and 50 via interconnects 45 and 55, respectively. Moreover, the memories 40 and 50 may be independent memories or portions of the same shared memory.

As specifically shown in FIG. 1, processors 20 and 30 are coupled to an input/output hub (IOH) 60 via point-to-point interconnects 70 and 75, respectively. IOH 60 provides connectivity between processors 20 and 30 and input/output (I/O) devices implemented within system 10. In addition, processors 20 and 30 are coupled to each other via a point-to-point system interconnect 80. According to one embodiment of the invention, these point-to-point interconnects 70, 75, 80 may be adapted to operate in accordance with "Common System Interconnect" specification being developed by Intel Corporation of Santa Clara, Calif.

Figure 2:
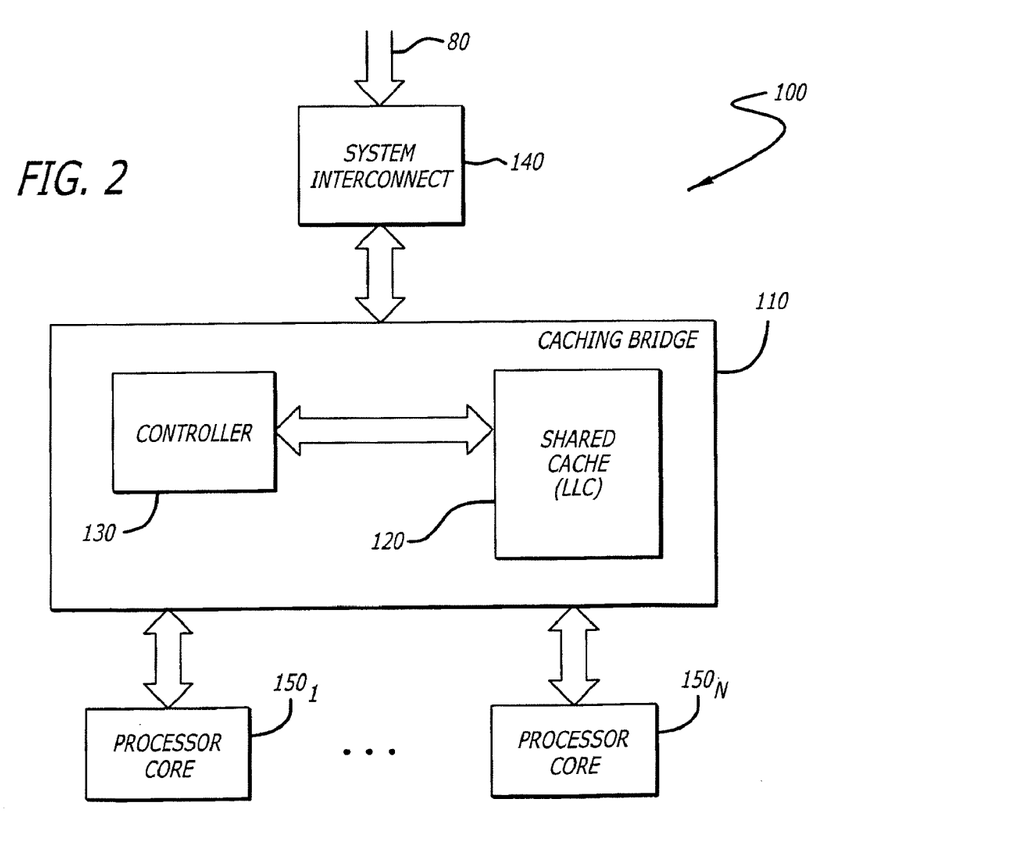
FIG. 2 is a first exemplary block diagram of a multi-core processor with a caching bridge configuration.

Referring now to FIG. 2, a first exemplary block diagram of multi-core processor 100 with a caching bridge configuration is shown. Herein, as shown, multi-core processor 100 comprises a caching bridge 110 that includes a shared cache 120 (identified as a "last level cache" or "LLC") and a centralized controller 130. Caching bridge 110 enables communications between (i) external components coupled to system interconnect (e.g., interconnect 80 of FIG. 1) via a system interconnect interface 140, (ii) shared cache 120 and (iii) a plurality of cores $150_1$-$150_N$ (N>1) in multi-core processor 100. Caching bridge 110 is responsible for maintaining coherency of cache lines present in shared cache 120.

While the caching bridge configuration of FIG. 2 provides one type of multi-core processor architecture, it is not highly scalable. For instance, multi-core processors with the caching bridge architecture can only feature up to four cores before experiencing degradation in system performance. If greater than four processor cores are deployed within the multi-core processor, system performance degradation will be experienced, caused by centralized cache bandwidth bottlenecks and on-die wiring congestion. Thus, multi-core processor 100 of FIG. 2 may not be an optimal architecture for multi-core processors larger than four (4) cores.

Figure 3:
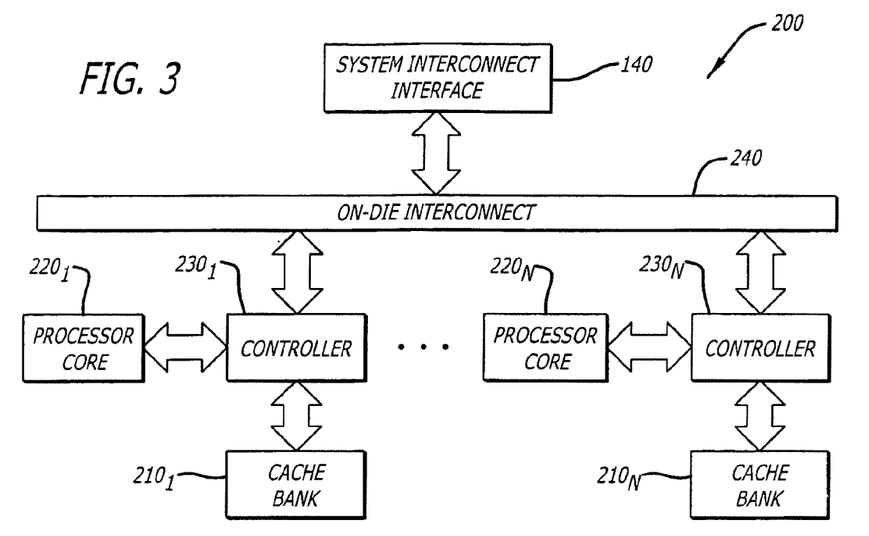
FIG. 3 is an exemplary block diagram of a multi-core processor having a distributed shared cache configuration.

Referring to FIG. 3, an exemplary block diagram of a multi-core processor 200 having a distributed shared cache configuration is shown. As shown, shared caches $210_1$-$210_N$ are distributed among the multiple cores $220_1$-$220_N$. External to and associated with cores $220_1$-$220_N$ and coupled to an on-die interconnect 240, each controller $230_1$-$230_N$ is responsible for maintaining coherency of shared caches $210_1$-$210_N$, respectively. On-die interconnect 240 is high-speed and scalable to ensure that distributed shared caches accesses have a low latency since on-die interconnect 240 lies in the critical path.

Herein, the distributed shared cache configuration may provide a more scalable architecture, but will experience a relatively higher latency access to the shared cache. The latency is higher than centralized cache because the cache addresses are distributed between multiple banks in the shared cache. Moreover, distributed shared cache configuration may experience bandwidth problems across its interconnect as more and more processor cores are added. For instance, on-die interconnect 240 has a constant bandwidth. Therefore, as the number of cores increase, the amount of bandwidth allocated per core decreases. Hence, multi-core processor 200 may not be an optimal architecture for multi-core processors having more than eight (8) cores.

Figure 4:
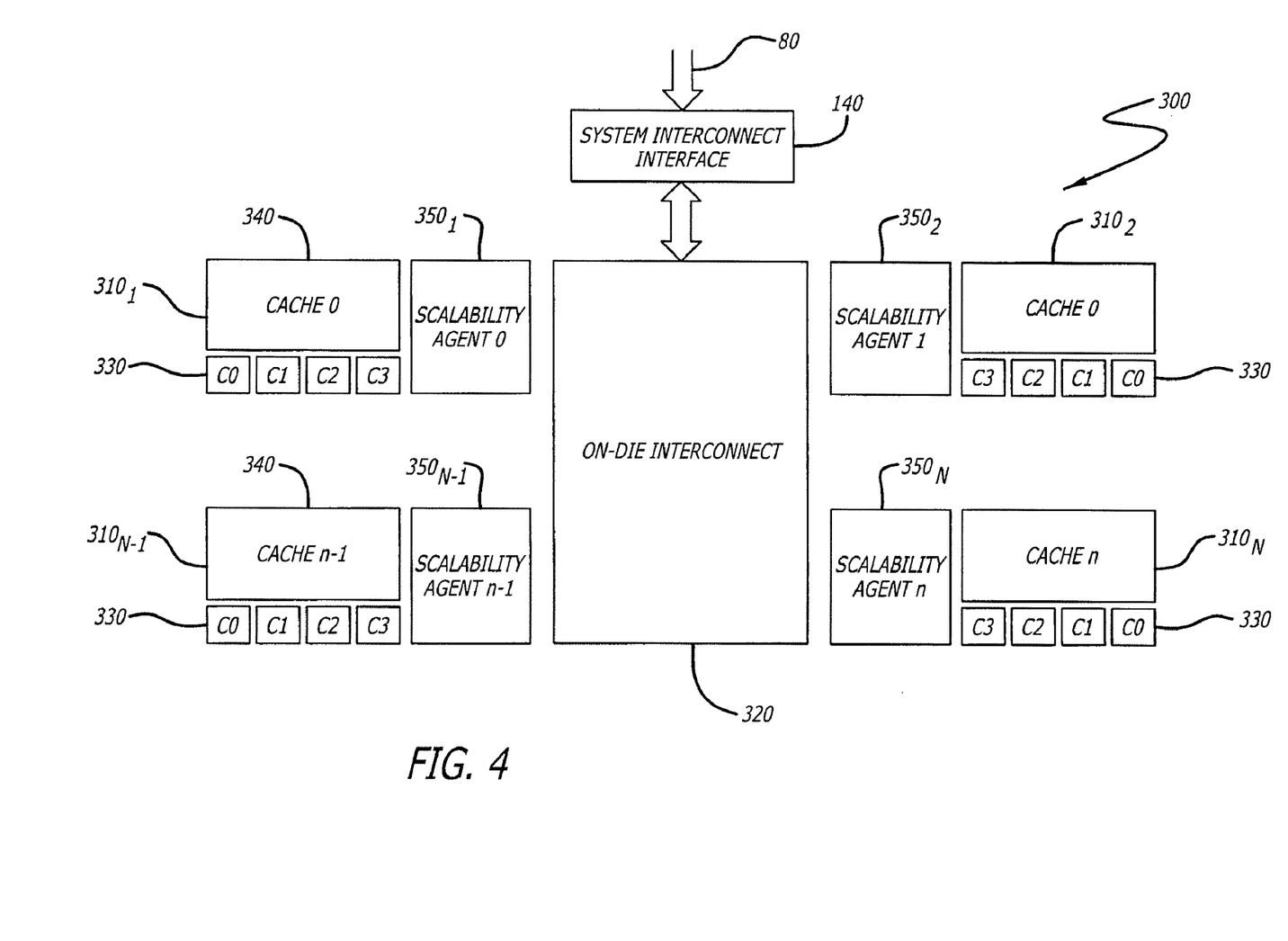
FIG. 4 is an exemplary embodiment of a multi-core processor with a clustered Chip Multi-Processors (CMP) having a scalability agent operating in accordance with an embodiment of the invention.

Referring now to FIG. 4, an exemplary embodiment of a multi-core processor 300 such as clustered Chip Multi-Processors (CMP) having a scalability agent is shown. Multi-core processor 300 comprises a plurality of core-cache clusters $310_1$-$310_N$ in communication with each other over an on-die interconnect 320. Multi-core processor 300 is in communication with externally located devices over a system interconnect interface 140. According to one embodiment of the invention, on-die interconnect 320 is configured as a ring interconnect, but may be configured as an interconnect mesh (e.g., 2D mesh).

Each core-cache cluster $310_1$, . . . , or $310_N$ include one or more cores 330 that share a cache 340. The architecture of core-cache clusters $310_1$, . . . , or $310_N$ may be in accordance with a caching bridge architecture of FIG. 1 or a distributed shared cache architecture of FIG. 2. The transactions involving core-cache cluster $310_1$-$310_N$ is controlled by a scalability agent 350 as described below.

According to this architecture, multi-core processor 300 enables the latency of a first shared cache $340_1$ to remain substantially constant despite increases in the number of cores in processor 300. This ensures that the scalar performance of threads with no or limited sharing remains constant.

In addition, multi-core processor 300 comprises one or more core-cache clusters $310_1$, . . . , and/or $310_N$ that can be aggregated to increase its overall performance and support next generation processor designs. For example, if the core-cache cluster is using the caching bridge style architecture, better performance may be realized by aggregating two (4-core) core-cache clusters in order to produce an eight core (8-core) multi-core processor. Also, for instance, two 4-core clusters can be used to build an 8-core processor in one generation, a 12-core processor in the next generation and 16-core processor in a subsequent generation. The appropriate number "N" of core-cache clusters $310_1$-$310_N$ and the number of cores in each core-cache cluster may be determined to achieve optimum performance. This offers flexibility and the option to choose a simpler implementation.

As further shown in FIG. 4, according to one embodiment of the invention, scalability agent (SA) 350 may be distributed so that scalability agent (SA) units $350_1$-$350_4$ (N=4) uniquely correspond to core-cache clusters $310_1$-$310_4$. More specifically, in order to create a scalable solution, SA 350 can be address partitioned into independent SA units $350_1$, . . . , or $350_4$ each of which is responsible for a subset of address space. For example, if SA 350 is partitioned into four address spaces, each partition supported by one SA unit identified the four SA units are denoted SA0, SA1, SA2 and SA3 respectively. FIG. 4 shows the case where four core-cache clusters (each with four cores) are aggregated using four SA units $350_1$-$350_4$.

Based on this configuration, scalability agent 350 is adapted to support a protocol, referred to as the scalability agent protocol, for aggregating core-cache clusters but the aggregation appearing as a single caching agent to devices communicatively coupled to a system interconnect. The purpose for such shielding the number of core-cache clusters is two-fold. First, the shielding mitigates interconnect saturation issues caused by repetitive traffic over on-die interconnect 240. Second, the shielding avoids repeated reconfiguration of CSI home agent. More specifically, if each processor core constituted a CSI caching agent, an "N" cluster, "M" socket system would be perceived as a N*M caching agent system to the CSI home agents in the system. Scalability agent 350 essentially functions by assuming the burden of local coherency and distributing coherency responsibilities to the core-cache clusters themselves. Otherwise, each time a core-cache cluster is modified or added, the CSI home agent would need to be re-designed.

Besides the shielded aggregation functionality, the scalability agent protocol is designed for handling local coherence between core-cache clusters on the same integrated circuit (IC). Also, the scalability agent is repartitioned so that each SA unit handles the same amount of work, namely the role of snooping the caching agents for incoming snoops and requests from other caching agents. As a result, any cluster is not affected significantly if another core-cache cluster is added or removed.

II. Scalability Agent Operations

As previously stated, the scalability agent protocol is implemented to support core-cache cluster aggregation while handling local coherence and substantially equal work distribution between core-cache clusters. This requires the scalability agent to control all coherent transactions issued by the core-cache clusters or received by the socket.

From the socket perspective, transactions can be classified into two broad classes: outgoing transactions and incoming transactions. For both classes of transactions, the scalability agent plays the role of the on-die snooping agent and snoop response aggregator.

Figure 5:
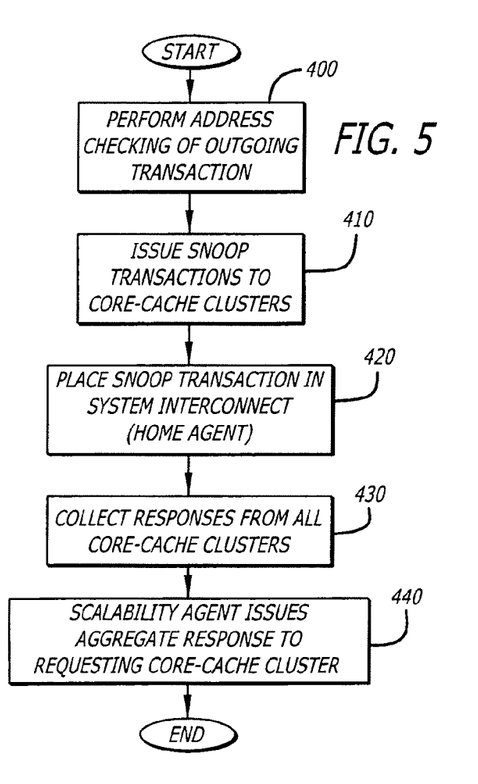
FIG. 5 is an exemplary flowchart of the operations of the scalability agent in support outgoing transactions.

For outgoing transactions, as shown in FIG. 5, the scalability agent will issue snoops to the core-cache clusters of the multi-core processor while concurrently issuing the transaction to the system interconnect (blocks 410 and 420). In parallel with the socket level coherence, the scalability agent will collect responses from all core-cache clusters (block 430). Based on these responses, the scalability agent will issue an aggregate response to the requesting core-cache cluster(s) (block 440). This ensures that each core-cache cluster is not aware of the nature or the number of the other core-cache clusters in the socket. Moreover, to ensure that the core-cache clusters collectively appear as one caching agent, the scalability agent will perform address checking operations in order to ensure that only one transaction for a given address can be issued to the system interconnect (block 400).

Figure 6:
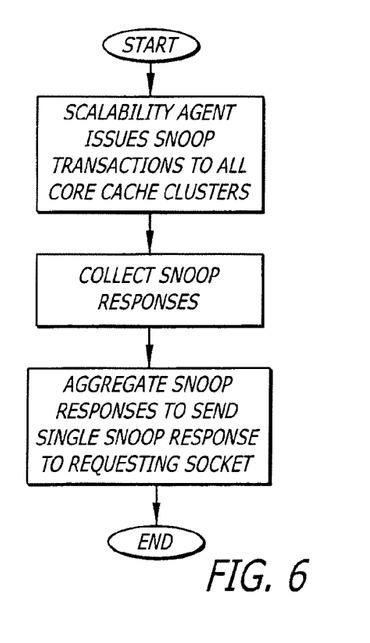
FIG. 6 is an exemplary flowchart of the operations of the scalability agent in support incoming transactions.

For incoming transaction, as shown in FIG. 6, the scalability agent will issue snoops to all core-cache clusters and collect snoop responses from them (block 500 and 510). On receiving snoop responses, the scalability agent will send a single snoop response to the requesting socket (block 520). This will also ensure that all core-cache clusters appear as one single caching agent to the system.

Therefore, in summary, the scalability agent conducts the following transaction level actions to perform snoop response aggregation and scale core-cache clusters on a socket.

(1) Incoming Transactions: the scalability agent (SA) issues snoops to all the core-cache clusters, collects the snoop responses and issues a combined snoop response to the home agent for the transaction (Snoop response aggregation); and (2) Outgoing transactions: SA issues snoops to all the core-cache clusters, collects on-die snoop responses from core-cache clusters, and issues a combined snoop response to the issuing core-cache clusters. To save latency of outgoing transactions, SA issue both CSI source broadcast and on-die snoop broadcast is issued simultaneously. (On-die snooping agent).

It is contemplated that scalability agent 350 of FIG. 4 may perform conflict checking procedures between the two classes of transactions and among transactions within the classes themselves. It is noted that CSI rules (and similar coherent interconnect rules) dictate that for a given caching agent, there cannot be more than one outstanding coherent transaction for a given physical address. Scalability agent 350 enforces this rule by checking CSI transactions issued from core-cache clusters $310_1$-$310_N$ for address conflicts. Hence, all outgoing coherent transactions issued by core-cache clusters $310_1$-$310_N$ need to be received by scalability agent 350 and checked for conflicts before issuing the CSI source broadcast (Outgoing conflict checking). The conflict checking functionality of the scalability agent is set forth in a copending application entitled "Conflict Detection and Resolution in a Multi Core-Cache Domain for a Chip Multi-Processor Employing Scalability Agent Architecture" filed concurrently herewith.

Figure 7:
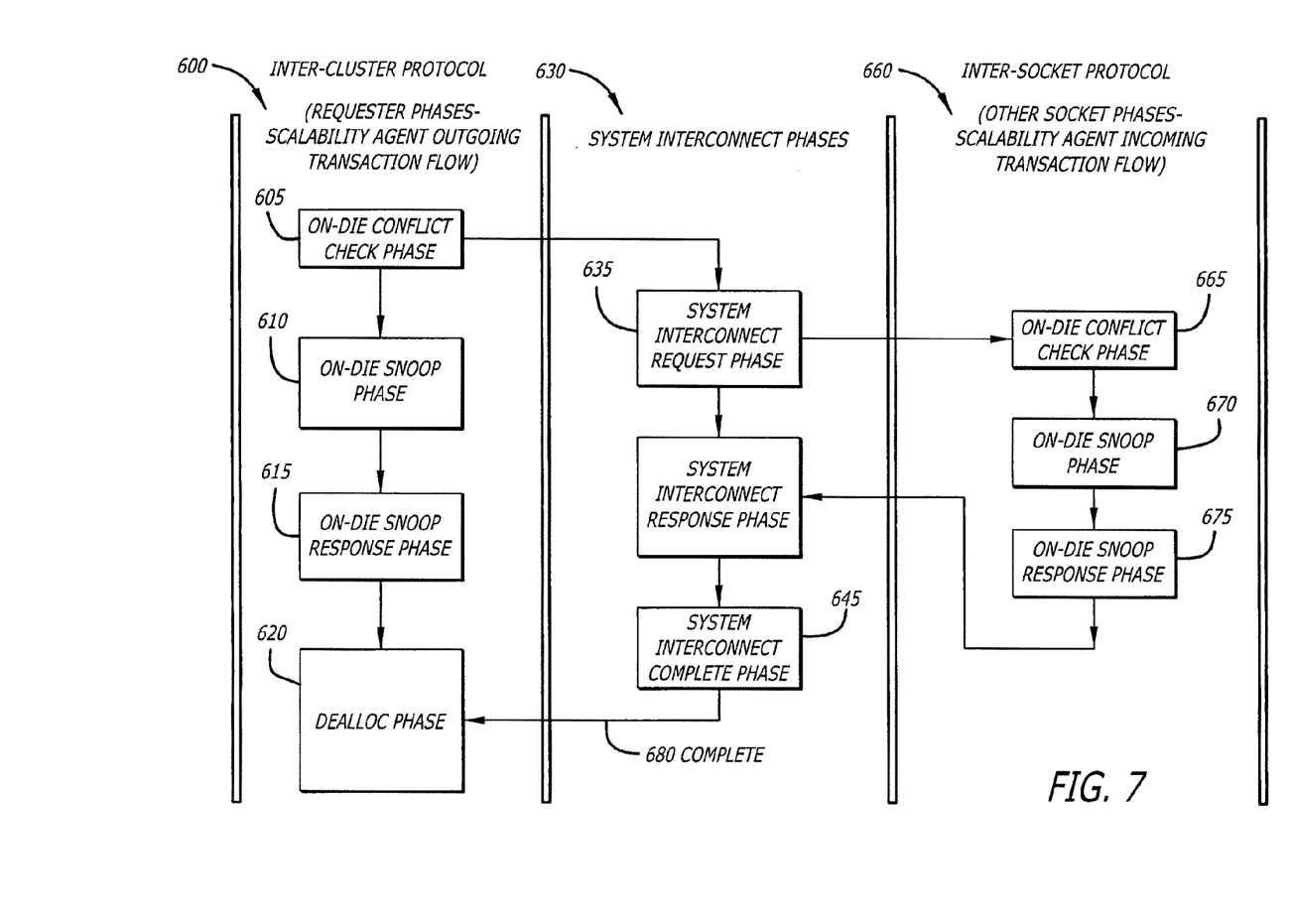
FIG. 7 is an exemplary embodiment of the transaction phase relationship of the scalability agent protocol.

Referring to FIG. 7, an exemplary embodiment of the transaction phase relationship of the scalability agent protocol is shown. In general, the scalability agent protocol comprises inter-cluster protocols 600 and 660 as well as an inter-socket protocol 630. Inter-cluster protocol 600 comprises four phases and is directed to operations between core-cache clusters forming the multi-core processor. Secondary inter-cluster protocol 660 comprises three phases and is directed to operations between devices in communication with the system interconnect and the multi-core processor. Inter-socket protocol 630 provides a mechanism for communications between these two protocols forming the scalability agent protocol.

For any given transaction, an on-die conflict check 605 of inter-cluster protocol 600 is performed to make sure that there are no conflicting transactions by ensuring that only one transaction per given address is issued to the system interconnect. During on-die conflict check phase 605, the transaction is invisible to the system interconnect.

During on-die conflict check phase 605, where the scalability agent (SA) 350 is implemented as multiple SA units $350_1$-$350_N$ with each SA unit responsible for a portion of address space as shown in FIG. 4, a core-cache cluster (e.g., cluster $310_1$ of FIG. 4) will issue a transaction to the appropriate SA unit (e.g., SA unit $350_1$). SA unit $350_1$ performs a conflict check for the transaction to ensure that only one transaction per given address is issued to the system interconnect 80 of FIG. 1. If no conflict is detected, SA unit $350_1$ sends an "Accept" message to the requesting core-cache cluster. However, if a conflict is detected, SA unit $350_1$ sends a "Reject" message to the requesting cluster, the requesting cluster will retry after a timeout.

Once the transaction completes the on-die conflict check phase, if it is a snoopable transaction (e.g., Read transaction), SA unit $350_1$ will issue snoops to all (on-die) core-cache clusters $310_2$-$310_N$ (except the issuer) and the system interconnect simultaneously.

As show, the transaction enters on-die Snoop phase 610 as well as system interconnect request phase 635 simultaneously. Therefore, during an on-die Snoop Response phase 615, SA unit $350_1$ collects responses from core-cache clusters $310_2$-$310_N$ and sends a response to the requesting source (core-cache cluster $310_1$). SA unit $350_1$ now enters into a Deallocation (Dealloc) phase 620 and waits a signal to denote completion of the System Interconnect Complete phase 645 that denotes completion of On-die Conflict Check phase 665 conducted between sockets of multi-core processor as well as On-die Snoop phase 670 and Snoop Response phase 675 to ensure that there are no inter-socket conflicts.

Similarly, as shown in FIGS. 1, 4 and 7, upon receiving a snoopable transaction, SA 350 issues snoops to all core-cache clusters, collects the responses and issues a response to the system interconnect. Eventually, the system interconnect will send a Complete signal 680 to the requesting core-cache cluster. On receiving Complete signal 680, the requesting core-cache cluster sends a DeAllocate message to SA 350, which causes SA 350 to deallocate the transaction from its tracking structures.

Hence, in accordance with the Scalability agent protocol described above, SA operates as a snoop response aggregator for core-cache clusters and presents the view of one caching agent to the other sockets. Moreover, the load on SA units $350_1$-$350_N$ can be balanced while increasing the number of core-cache clusters on the socket.

Herein, examples transaction flows for a two core-cache cluster with two SA units are shown for outgoing read/write and incoming read transactions. CSI transaction terminology is used to illustrate the coherence protocol sequence.

A. OUTGOING TRANSACTION FLOW—READ (NO CONFLICT)

Figure 8:
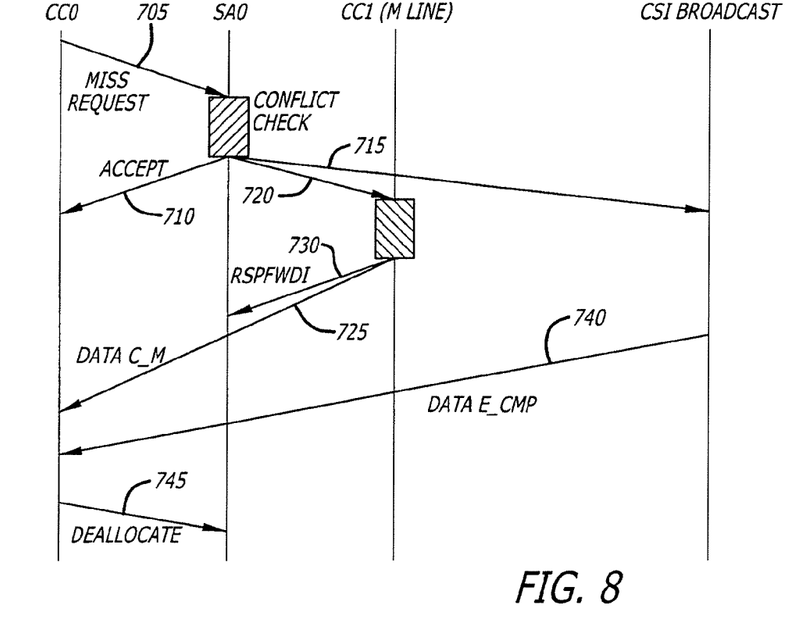
FIG. 8 is an exemplary operational flow during a Read transaction initiated by a first core-cache cluster for a line which is contained in M state in a second core-cache cluster in accordance with the scalability agent protocol.

In the diagrams shown below, the terms "CC0" and "CC1" is used to represent a first core-cache cluster (CC0) and a second core-cache cluster (CC1). FIG. 8 below shows an example flow of a Read request from CC0 for a line which is contained in M state in CC1. Examples of the Read Request include, but are not limited or restricted to Read Code (RD-Code), Read Data (RdData), Read Invalidate-to-Own (RdInvOwn) and the like.

CC0 issues a Miss request 705 to the SA and waits for an Accept/Reject message from the SA. Since the scalability agent protocol is a distributed protocol, according to this embodiment of the invention, SA comprises two SA units, corresponding in number to the number of core-cache clusters CC0 and CC1, that are responsible for maintaining coherency for one-half of the system address space. As shown, a first SA unit (SA0) maintaining the address associated with the Miss Request performs a conflict check by reviewing a stored list of outstanding transactions on the system interconnect.

As shown, a first SA unit (SA0) issues an accept message 710 to CC0 to notify the requester that SA0 has not detected any conflicts. CC0 can now consider that an off-die Request phase has commenced by placement of a CSI Request 715 on the system interconnect directed to off-die CSI agents, which may include a home agent. In addition, On-die Snoop requests 720 are initiated to the non-requesting, on-die core-cache clusters. As shown, CC1 may not be on the same socket as the home agent.

CC1 completes a snoop of its shared cache and determines that the cache line is in "M" state. Since the original transaction received an Accept message from SA0, CC1 does not have any outstanding transactions to the same address that is identified in the CSI request phase. This implies that CC1 will not respond with a conflict detection "RspCnflt" signal.

To take advantage that the requested line of data in on-die, CC1 directly sends the requested data (DataC_M) 725 from CC1 to CC0 and sends a Response Forward Invalid "RspFwdI" message 730 to SA0 to denote that the requested data has been forwarded to the requester (CC0) and the current state of this requested data in CC1 is "I" state according to the MESI protocol. CC1 is able to send the data to the requesting core-cache cluster since the requesting node-id is embedded in the snoop request 720 from SA. Upon receipt, CC0 can begin using the data.

Figure 9:
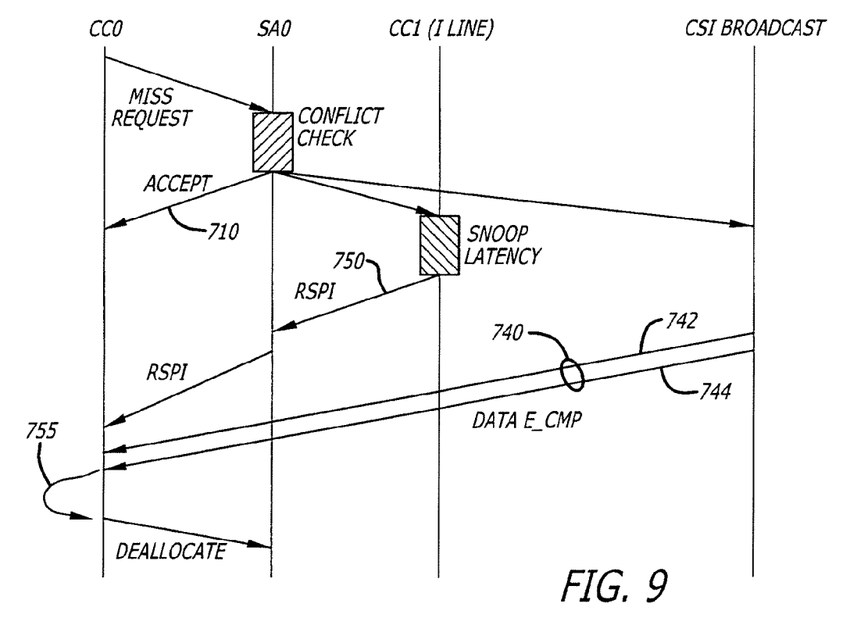
FIG. 9 is an exemplary operational flow during a Read transaction initiated by a first core-cache cluster for a line that is not contained in a second core-cache cluster in accordance with the scalability agent protocol.

Otherwise, as shown in FIG. 9, SA0 will need to send a Response Invalid "RSPI" message 750 to CC0. CC0 waits for response from SA0 as well as a message (Data_E_Cmp) 740 from the CSI home agent before issuing a global observation (G.O) 755 to the requesting processor core in order to release ordering constraints and allow use of the data. G.O indicates that the corresponding request has been observed globally and responses are complete. A "Data_E_Cmp" message 740 is a message that comprises two transactions, which can be sent in a single message or via separate messages as shown for illustrative purposes. A first message (Data_E) 742 indicates that CC0 is receiving the requested cache line in E-state, namely "Exclusive" state in accordance with MESI protocol. A second message (Complete "Cmp") 744 indicates that the data and a global observation can be sent back to a requesting core-cache cluster.

Returning back to FIG. 8, SA0 does not need to send a response to CC0, since SA0 knows from the forward message (RspFwdI) that CC0 will receive the requested data from CC1 (DataC_M). Rather, the SA0 keeps track of the address associated with the Miss request and waits for a "Deallocate" message 745 from CC0. SA0 plays the role of mediator for coherence state, but does not play any role in data transfer.

At some point, CC0 will receive a Data_E_Cmp message 740 from the CSI home agent. It is the responsibility of the CC0 to ensure that it will send the correct data to the requesting core. In this case, CC0 receives the forwarded data from CC1 before the complete from CSI home agent. CC0 can forward this data to core and globally observe the core. If CC0 receives a complete from CSI home agent before the on-die snoop response, it needs to wait for the on-die snoop response before it can reliably globally observe (G.O) the cores. This however is expected to be an unlikely scenario, in the common case, on-die snoop responses are received before the complete from CSI home agent.

Once the core receives a globally observation and CC0 determines that CSI transaction is complete, it issues the "Deallocate" message 745 to SA0. During its whole existence from the On-die request phase to the end of the de-allocate phase (conflict window), SA0 will ensure that any transactions to the same address are retried. Since the data is reliably forwarded to the requesting agent, SA0 does not contain any data buffers.

B. OUTGOING TRANSACTION FLOW—WRITE (NO CONFLICT)

Figure 10:
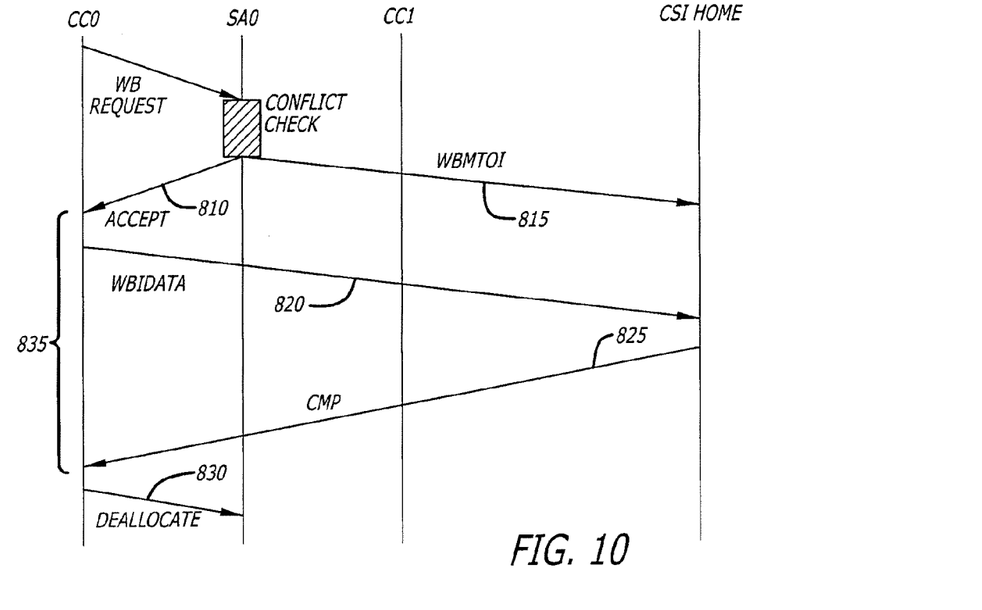
FIG. 10 is an exemplary operational flow of a Write transaction initiated by a first core-cache cluster.

Referring now to FIG. 10, an exemplary embodiment of the scalability agent protocol for a dual core-cluster processor is shown. Write class transactions do not require on-die snooping action from SA. However, these transactions still need to go through SA to ensure that conflict checking is performed between outgoing transactions from other core cache clusters as well as the requesting core cache cluster. Since SA does not contain any data buffers, an accept message from SA is interpreted as a permission to the issue the data message to CSI link directly. In other words, for write class transactions, SA only sequences the address portion of the request and not the data portion. Core cache cluster is responsible for transferring the data portion when the transaction enters request phase in CSI.

For example, with respect to FIG. 10, an example flow for Writeback (WbMtoI) transaction is shown. First, CC0 issues a Writeback (Wb) transaction 805 to SA0, which performs a conflict check and issues an Accept message 810 to CC0. Along with Accept message 810, SA0 issues a Write transaction (WbMtoI) 815 to the CSI home agent that is responsible for this address. On receiving Accept message 810, CC0 will issue the WbIData transaction (data message) 820 to the CSI home agent. Eventually, CC0 will receive a Complete (CMP) message 825 from the CSI home agent, and in turn, will issue a Deallocate message 830 to SA0. SA0 will deallocate the tracker entry associated with the fetched cache line on receiving Deallocate message 830. From transmission from Accept message 810 to reception of Deallocate message 830, namely a conflict window 835, conflicting transactions to the same address are retried by SA0.

C. INCOMING TRANSACTION FLOW—SNOOP (NO CONFLICT)

Figure 11:
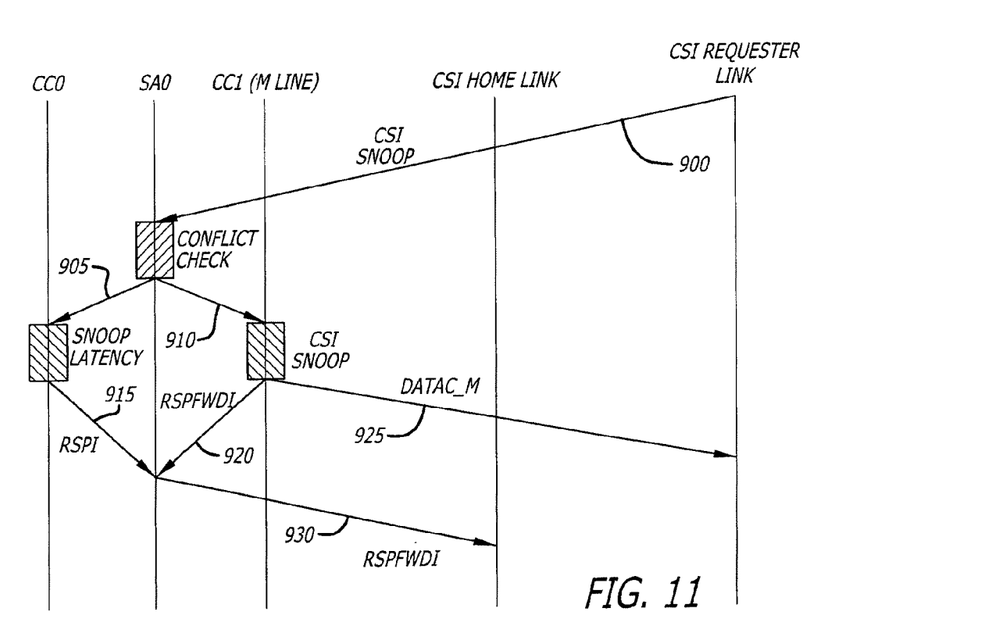
FIG. 11 is an exemplary embodiment of an incoming transaction in accordance with the scalability agent protocol.

Referring now to FIG. 11, an exemplary embodiment of the scalability agent protocol for a multi-core processor supporting an incoming transaction is shown. An "incoming" transaction to SA0 consists of all transactions received over the system interconnect inclusive of snoop messages from a remote caching agent (e.g., processor core from another socket. The following transactions belong to the incoming transaction class: (1) Snoop Code (SnpCode); Snoop Data (SnpData); Snoop Invalidate-to-Own (SnpInvlOwn) and the like. SA0 is a non-blocking unit for incoming transactions even in the presence of conflict.

On receiving an incoming transaction 900, SA0 will issue snoop messages 905 and 910 to all of the on-die core-cache clusters (CC0, CC1) after the conflict check phase. If a conflict is detected, snoop messages 905 and 910 will be marked with appropriate information.

Thereafter, SA0 waits to receive snoop responses 915 and 920 from all of the on-die core-cache clusters. Similar to the Read transaction of FIG. 7, if the cache line is uncovered in a "Modified" state in accordance with the MESI protocol, the data is forwarded directly sent to the requesting node. As shown, the snoop of system address space maintained by CC1 results in detection of the requested cache line in M-state. CC1 sends an RspFwdI message 920 and issues a DataC_M message 925 to the requesting node. SA0 will receive an RspI message 915 from CC0.

SA0 computes a unified response 930 in order to form a joint response for the socket. As shown, SA0 issues a RspFwdI message 920 to the Home agent for the current request. SA0 does not handle any data flow related sequencing.

In summary, the invention presents an important invention in the area of large scale CMP. The scalable core-cache cluster aggregation architecture can be used by processors with larger and larger numbers of cores by aggregating core-cache clusters. Scalability agent provides a technique for ensuring that as core-cache clusters are added, the system interconnect does not see an increase in the number of caching agents nor does it see an increase in the number of snoop responses. The on-die snooping functionality of the scalability agents ensures a low latency cache-to-cache transfer between core-cache clusters on the same die. With increasing silicon efficiencies, large number of core-cache clusters can be aggregated on the die.

The on-die interconnect latency and bandwidth are non-critical since the traffic from processor cores is filtered through a shared cache. This technique can be used to processors with a large number of cores, once any core-cache cluster architecture reaches limits in terms of design complexity and bandwidth. Once a cluster is built, its design can be optimized while across generations, the same cluster can be used to build processors with large number of cores.

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. A method comprising:
providing a plurality of core-cache clusters, each of the plurality of core-cache clusters including a cache memory and at least one processor core in communication with the cache memory; and
operating in accordance with a protocol to ensure that the plurality of core-cache clusters appear as a single caching agent.

2. The method of claim 1, wherein the operating in accordance with a protocol comprises controlling, by at least one scalability agent, all coherent transactions issued by the plurality of core-cache clusters.

3. The method of claim 2, wherein the at least one scalability agent issues snoop requests to core-cache clusters of the plurality of core-cache clusters while concurrently issuing a transaction to a system interconnect.

4. The method of claim 3, wherein the at least one scalability agent collects snoop responses from the core-cache clusters.

5. The method of claim 4, wherein the at least one scalability agent issues an aggregate response to a requesting core-cache cluster of the plurality of core-cache clusters.

6. The method of claim 4, wherein the at least one scalability agent performs address checking operations in order to ensure that only one transaction for a given address can be issued to the system interconnect.

7. The method of claim 2, wherein the at least one scalability agent issues snoop requests to the plurality of core-cache clusters and collects snoop responses from all of the plurality of core-cache clusters.

8. The method of claim 7, wherein the at least one scalability agent sends a single snoop response to a requesting socket.

9. The method of claim 1, wherein the scalability agent includes a plurality of scalability agent units each uniquely corresponding to a core-cache cluster of the plurality of core-cache clusters and responsible for a subset of an address space.

10. A method comprising:
configuring a multi-core processor with a plurality of core-cache clusters, each core-cache cluster including at least one processor core and a scalability agent unit to manage a flow of information with the plurality of core-cache clusters; and
coupling the multi-core processor to a system interconnect, the plurality of core-cache clusters to appear as a single caching agent to devices communicatively coupled to the system interconnect.

11. The method of claim 10 further comprising:
handling local coherence between the plurality of core-cache clusters by each scalability agent unit issuing snoops and collecting responses to check for address conflicts.

12. The method of claim 11, wherein each of the plurality of scalability agent units is further adapted to send a snoop response message aggregated from the collected snoop responses over the system interconnect so that the plurality of core-cache clusters appear as the single caching agent.

13. The method of claim 11, wherein each scalability agent unit is responsible for a different portion of a system memory address space.

14. The method of claim 11, wherein the configuring of the multi-core processor further comprises configuring each scalability agent to handle an equal amount of work.

15. A system comprising:
a memory; and
a processor coupled to the memory, the processor comprises:
an on-die interconnect,
a plurality of core-cache clusters, each of the plurality of core-cache clusters including both a cache memory and one or more processor cores in communication with the cache memory, and a scalability agent coupled to the on-die interconnect, the scalability agent operating in accordance with a protocol to ensure that the plurality of core-cache clusters appear as a single caching agent.

16. The system of claim 15, wherein the scalability agent of the processor includes a plurality of scalability agent units each uniquely associated with one of the plurality of core-cache clusters and adapted to issue a snoop message and collect snoop responses to the snoop message.

17. The system of claim 16, wherein each of the plurality of scalability agent units of the processor is further adapted to send a snoop response message aggregated from the collected snoop responses over a system interconnect so that the plurality of core-cache clusters appear as the single caching agent.

18. The system of claim 16, wherein the plurality of scalability agent units of the processor correspond in number to the plurality of core-cache clusters and each of the plurality of scalability agent units.

19. The system of claim 15, wherein the plurality of core-cache clusters of the processor comprises a first core-cache cluster including (i) a first cache memory, (ii) a first plurality of processor cores in communication with the first cache memory, and (iii) a first scalability agent unit coupled to the on-die interconnect and in communication with the first cache memory and the first plurality of processor cores, the first scalability agent being responsible for a first portion of a system memory.

20. The system of claim 19 wherein the plurality of core-cache clusters of the processor further comprises a second core-cache cluster including (i) a second cache memory, (ii) a second plurality of processor cores in communication with the second cache memory, and (iii) a second scalability agent unit coupled to the on-die interconnect and in communication with the second cache memory and the second plurality of processor cores, the second scalability agent being responsible for a second portion of the system memory differing from the first portion of the system memory.

* * * * *